UNITED STATES PATENT OFFICE.

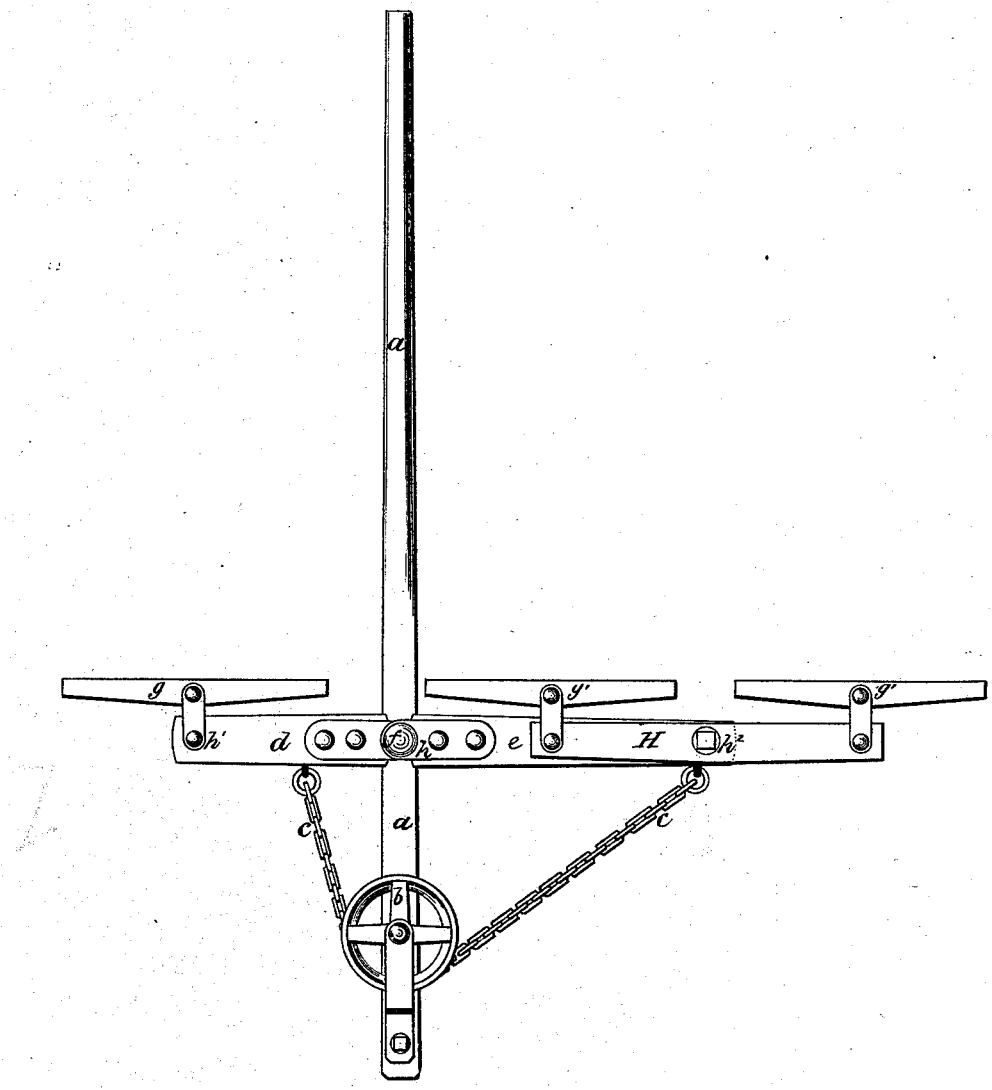

EZRA GRAHAM, OF MANCHESTER, IOWA, ASSIGNOR TO HIMSELF AND ENOS HAMBLIN, OF SAME PLACE.

IMPROVEMENT IN DRAFT-EQUALIZERS.

Specification forming part of Letters Patent No. 168,248, dated September 28, 1875; application filed August 23, 1875.

*To all whom it may concern:*

Be it known that I, EZRA GRAHAM, of Manchester, in the county of Delaware and State of Iowa, have invented a new and Improved Three-Horse Equalizer; and I do hereby declare that the following is a full, clear, and exact description of the same, reference being had to the accompanying drawing, forming a part of this specification, in which the figure is a plan view.

The invention will first be described in connection with drawing, and then pointed out in the claim.

$a$ is the tongue or pole to wagon, harvester, or other vehicle, and $b$ a pulley on pole, made of cast-iron, with groove around its circumference. $c$ is a chain passed around the pulley and attached to the two pivoted bars or levers $d\ e$, the latter being connected with pole at the same joint by a bolt or pin, $f$, passing through the hasp or hame-strap $h$, and making a flexible joint on pin when the same is attached to the pole. The lever $d$ has the one-horse whiffletree $g$ attached to its end and the opposite joint, and chain $c$ attached in the middle, thus having the weight equidistant, or nearly so, between the power $g$ and pin. The lever $e$ is double the length of lever $d$ for the purpose of throwing the power far enough from tongue to use two horses. $g'\ g'$ are single whiffletrees, two being attached to the double-tree H on lever $e$. The point of strain $h^2$ is thus just double the distance of the point of strain $h^1$ from the pole.

Having thus described my invention, what I claim as new is—

The combination, with pole $a$, of unequal levers $d\ e$, jointed on the same pole-pin, and connected by a chain, $c$, passing over a rear pole-pulley, $b$, to form the three-horse equalizer specified.

EZRA GRAHAM.

Witnesses:
E. M. CARR,
A. S. BLAIR.